March 16, 1943.  R. H. GARBE ET AL  2,314,138
THREAD TAPPING APPARATUS
Filed Oct. 18, 1941
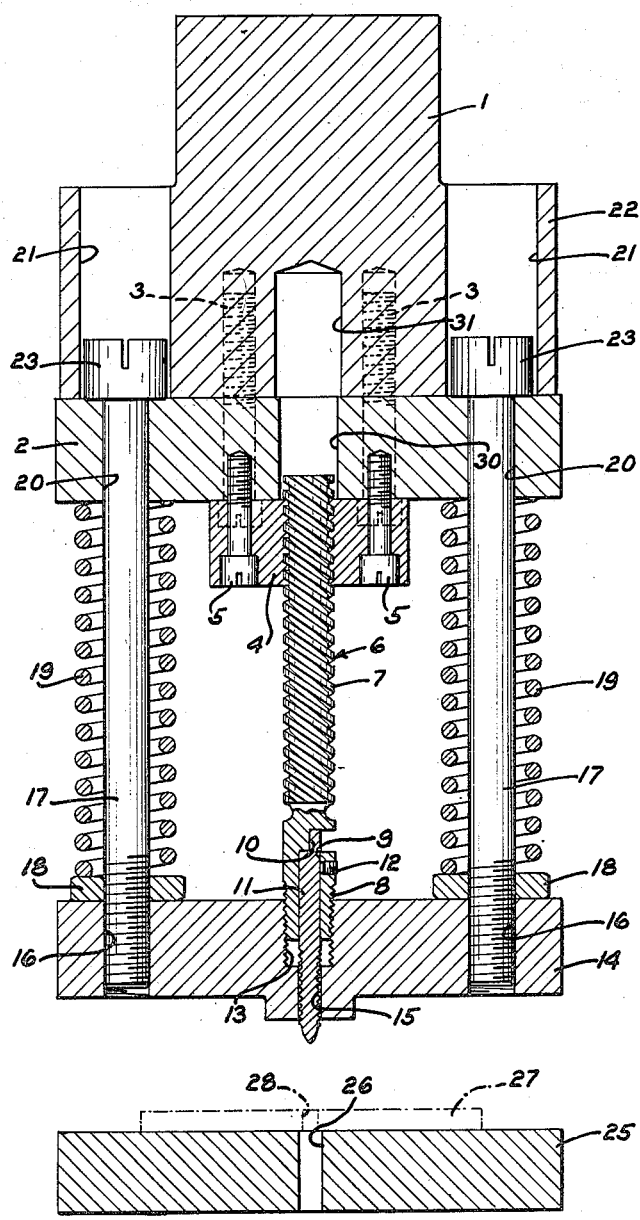
INVENTORS
R. H. GARBE
F. S. WESLEY
BY *Harry L. Duft*
ATTORNEY Patented Mar. 16, 1943

2,314,138

UNITED STATES PATENT OFFICE 2,314,138

THREAD TAPPING APPARATUS

Rudolph H. Garbe, Forest Park, and Frank S. Wesley, Downers Grove, Ill., assignors to Western Electric Company, Incorporated, New York, N. Y., a corporation of New York Application October 18, 1941, Serial No. 415,596

11 Claims. (Cl. 10—129)

This invention relates to thread tapping apparatus and more particularly to thread tapping apparatus constructed for operation by a punch press.

It is an object of the present invention to provide a simple and inexpensive tapping device operable by a reciprocating actuator.

In accordance with one embodiment of the invention, the tapping apparatus comprises a threaded rod having a tap fixed in one end of it and being so threaded throughout most of its length that rotary motion will be imparted to it by a threaded member or nut attached to the ram of a punch press and having its internal threads engaging the thread of the threaded rod. The stripper plate of the punch press, which is resiliently urged to a predetermined position with respect to the ram of a punch press, is threaded internally with a thread, the pitch of which corresponds to the pitch of the tap fixed in the end of the threaded rod and a portion of the threaded rod is threaded to engage in the threads in the stripper, thereby to determine the rate of travel of the tap through the part to be threaded. The bed of the punch press is suitably apertured to permit the tap which has been advanced through an article resting on the bed to pass into the bed.

A better understanding of the invention may be had by referring to the drawing, wherein the single figure represents a view in cross section through a portion of a punch press and illustrates one form of the invention.

Referring to the drawing, wherein like reference characters designate similar parts, there is shown a punch holder 1, which may be secured to or form a part of the ram of a punch press. The punch holder has a plate 2 secured to its underside by any suitable means, for example, machine screws 3—3. Suitably fixed to the underside of plate 2 is an internally threaded member or multi-thread nut 4 which may be attached to the plate 2 by machine screws 5—5. The internally threaded member or nut 4 is adapted to receive a spindle 6 having a lefthand quadruple threaded portion 7. Suitable apertures 30 and 31 are provided in the plate 2 and the punch holder 1, respectively, coaxially with the threaded aperture in the internally threaded member 4, whereby when the punch holder is reciprocated, the spindle 6 may move upwardly into the punch holder 1.

The lower end of the spindle 6 has a righthand thread cut on it, as indicated at 8, and is provided with a central bore 9, which extends to a cut out slot 10, the bore 9 and cut out slot 10 being adapted to receive a thread cutting tap 11, which may be held in place by a set screw 12. The threaded portion 8 of the spindle 6 is threaded into a threaded bore 13 formed in a stripper plate 14. The bore 13 terminates in an unthreaded portion 15, through which the tap 11 passes freely. The stripper plate 14 is threaded, as shown at 16—16, to receive the lower ends of tie bolts 17—17 for adjustably supporting the stripper plate with respect to the plate 2. The tie bolts 17—17 have lock nuts 18—18 threaded on them whereby they may be locked with respect to the stripper plate 14 to hold the stripper plate 14 in any one of a number of adjusted positions.

Surrounding the tie bolts 17—17 and interposed between the lock nuts 18—18 and the lower surface of the plate 2 are a pair of compression springs 19—19, which normally urge the tie bolts and attached stripper plate 14 downwardly. The plate 2 is provided with guide apertures 20—20, in which the tie bolts 17—17 are freely slidable, and in axial alignment with the apertures 20—20 are apertures 21—21 formed in a shoulder portion 22 of the punch holder 1 for receiving and permitting passage upwardly of the heads 23—23 of the tie bolts 17—17, the shoulders of the heads 23—23 of the tie bolts engaging the upper surface of the plate 2 and limiting the downward movement of the tie bolts and attached stripper plate. The bed of the punch press, as shown at 25, is provided with an aperture 26 in axial alignment with the tap 11 and the bed is adapted to support an article indicated by dot-dash lines at 27 with a punched aperture 28 aligned with the tap 11.

While the apparatus described in detail hereinbefore may be used for performing many tapping operations, it is particularly adaptable to use in a punch press in conjunction with progressive dies or punching mechanisms wherein, for example, the aperture 28 may be perforated in the article 27 at one position of the punch press and at a following position the apparatus of the present invention may tap the hole 28.

Although a specific embodiment of the invention has been described hereinbefore, it will be understood that various modifications and adaptations thereof may be made without departing from the invention, which is to be limited only by the scope of the appended claims.

What is claimed is:

1. An apparatus for forming threads, comprising a support for an article to be threaded, a threading tool, a reciprocatory member for imparting rotary movement to said threading tool, and means for advancing the threading tool a distance equal to its pitch for each revolution of said tool.

2. An apparatus for forming threads, comprising a reciprocable threaded member, a spindle having threads operatively engaging the threads in said reciprocable member, a thread cutting tool fixed to an end of said spindle and having a thread of predetermined pitch, a member urged to reciprocate with the reciprocable member and having a threaded aperture therein, the thread of which has the same pitch as the thread cutting tool, and a threaded portion formed on the spindle and operatively engaged in the last mentioned threads.

3. An apparatus for forming threads comprising a reciprocatory driving member, a cooperating driven member threaded into said driving member, means for reciprocating the driving member to impart rotation to the driven member, means urged to reciprocate with the driving member, and cooperating threads on said last mentioned means and the driven member for controlling the rate of advance of the driven member.

4. An apparatus for forming threads comprising a spindle having a lefthand threaded portion, a reciprocable internally threaded member threadedly engaging said portion to impart rotation to the spindle, a tap having a predetermined pitch mounted in said spindle, and means resiliently urged to reciprocate with said internally threaded member for advancing the tap a distance equal to its pitch for each revolution thereof.

5. An apparatus for forming threads comprising a threading tool rotatable to cut a thread in an article, a reciprocable driving member, a driven member for supporting said tool and adapted to be rotated upon reciprocation of said driving member, and means for determining the rate of advance of the threading tool.

6. An apparatus for cutting threads in an article, a reciprocating driving mechanism, means cooperating with said driving mechanism for actuation thereby comprising a threaded member mounted on the reciprocating driving mechanism, a cooperating threaded member rotatable upon reciprocation of said last mentioned threaded member, a thread cutting tool mounted on the rotatable member, and means urged to reciprocate with the driving means and threadedly engaging the rotatable member to determine the rate of advance of the thread cutting tool.

7. An apparatus for forming threads in an article comprising a reciprocating member, a stripper urged to reciprocate with said member, an internally threaded member fixed to said reciprocating member, a spindle threaded in said internally threaded member, a tap mounted in the end of said spindle, and cooperating threads in said stripper and on said spindle for determining the rate of advance of the tap in its thread cutting operation.

8. In an apparatus for cutting threads in an article, a threading tool, a spindle for supporting said threading tool, cam threads formed on said spindle, a driving member having camming threads cooperating with the cam threads on said spindle for imparting rotation to said spindle, means for reciprocating said driving member, a stripper resiliently connected to the driving member, and cooperating threads in the spindle and stripper, said last mentioned threads having the same pitch as the thread of the thread cutting tool.

9. An apparatus for driving a rotating tool comprising a reciprocating member, a rotatable member driven by said reciprocating member, a tool carried by said rotating member, a work engaging member, and means for causing rotation of said rotatable member operable by relative movement between said reciprocating member and said work engaging member.

10. An apparatus for driving a rotating tool comprising a reciprocating member, a rotatable member driven by said reciprocating member, a tool carried by said rotating member, a stripper plate for guiding the tool and engageable with the work, and means for causing rotation of said rotatable member by relative movement between said reciprocating member and said stripper plate.

11. An apparatus for driving a rotating tool comprising a reciprocating member, a rotatable member driven by said reciprocating member, a tool carried by said rotatable member, a member for controlling the advancing movement of said tool, and yielding means for normally holding said tool controlling member in a predetermined position relative to said reciprocating member for restoring the tool to normal inactive position.

RUDOLPH H. GARBE.
FRANK S. WESLEY.